(12) United States Patent
Fan et al.

(10) Patent No.: US 12,003,653 B2
(45) Date of Patent: Jun. 4, 2024

(54) METHOD FOR MANAGING CONSORTIUM CHAIN DATA STRUCTURE NETWORK, MANAGEMENT NODE, AND NON-TRANSITORY COMPUTER-READABLE RECORDING MEDIUM

(71) Applicants: Xiaojing Fan, Beijing (CN); Wei Wang, Beijing (CN); Jinting Hou, Beijing (CN)

(72) Inventors: Xiaojing Fan, Beijing (CN); Wei Wang, Beijing (CN); Jinting Hou, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 17/348,946

(22) Filed: Jun. 16, 2021

(65) Prior Publication Data

US 2021/0399904 A1  Dec. 23, 2021

(30) Foreign Application Priority Data

Jun. 19, 2020 (CN) .......................... 202010564760.0

(51) Int. Cl.
*H04L 9/32* (2006.01)
*H04L 9/00* (2022.01)

(52) U.S. Cl.
CPC .......... *H04L 9/3265* (2013.01); *H04L 9/3247* (2013.01); *H04L 9/50* (2022.05)

(58) Field of Classification Search
CPC ........ H04L 9/3265; H04L 9/3247; H04L 9/50
See application file for complete search history.

(56) References Cited

U.S. PATENT DOCUMENTS

2019/0317924 A1* 10/2019 Alimi ..................... H04L 9/3263
2020/0336481 A1* 10/2020 Fan ......................... H04L 9/0869
2021/0073369 A1* 3/2021 Fan .......................... G06F 21/44

FOREIGN PATENT DOCUMENTS

JP           2021-15398          2/2021

OTHER PUBLICATIONS

Office Action for JP2021-100289 dated May 10, 2022.

\* cited by examiner

*Primary Examiner* — Brandon Hoffman
*Assistant Examiner* — Mayasa A. Shaawat
(74) *Attorney, Agent, or Firm* — IPUSA, PLLC

(57) ABSTRACT

A method for managing a consortium chain data structure network, a management node, and a non-transitory computer-readable recording medium are provided. The consortium chain data structure network includes a first network that maintains a first chain data structure for recording management data, and a second network that maintains a second chain data structure for recording user data. A management node for management consensus of the consortium chain data structure network only accesses the first network. In the method, the management node receives a management request message sent by a requesting node, verifies the management request message, and processes the management request message in response to successful verification on the management request message. A data block in the first chain data structure is generated based on a result of the processing.

20 Claims, 6 Drawing Sheets

METHOD FOR MANAGING CONSORTIUM CHAIN DATA STRUCTURE NETWORK, MANAGEMENT NODE, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202010564760.0 filed on Jun. 19, 2020, the entire contents of which are incorporated herein by reference.

BACKGROUND OF THE INVENTION

1. Field of the Invention

The present disclosure relates to the field of management of consortium chain data structure networks, and specifically, a method for managing a consortium chain data structure network, a management node, and a non-transitory computer-readable recording medium.

2. Description of the Related Art

The chain data structure technology is a new infrastructure and calculation method that uses chain structures of data to ensure immutability and traceability, uses digital signatures to achieve permission control, and uses consensus algorithms to reach consensus of nodes in a chain data structure network to generate and update data, and uses smart contracts composed of automatic script codes to program and manipulate data. The consortium chain data structure network is usually a distributed network jointly established by parties such as organizations or entities that form a consortium, which includes a large number of nodes controlled by the parties, thus a distributed algorithm for reaching a consensus of the parties on management of the network may be inefficient. Accordingly, a centralized management node may be used as a manager to coordinate among the nodes in the network, thereby improving the efficiency of reaching a management consensus on the network. However, the centralized management node is not conducive to maintaining the privacy of user data, and once the management node is hacked, the security of user data will be seriously affected.

Furthermore, organizations usually configure nodes in the respective organizations so that the nodes can form a consortium chain data structure network. However, such a consortium establishment method is usually inefficient and cannot support dynamically changing membership in the consortium. Moreover, when a new organization requests to join the consortium, the existing members of the consortium, as data providers, may wish to have a right to refuse access on the network from a node that may affect the security of their data.

SUMMARY OF THE INVENTION

According to an aspect of the present disclosure, a method for managing a consortium chain data structure network is provided. The consortium chain data structure network includes a first network that maintains a first chain data structure for recording management data, and a second network that maintains a second chain data structure for recording user data. A management node for management consensus of the consortium chain data structure network only accesses the first network. The method includes receiving, by the management node, a management request message sent by a requesting node; verifying, by the management node, the management request message; and processing, by the management node, the management request message in response to successful verification on the management request message. A data block in the first chain data structure is generated based on a result of the processing.

According to another aspect of the present disclosure, a management node for management consensus of a consortium chain data structure network is provided. The consortium chain data structure network includes a first network that maintains a first chain data structure for recording management data, and a second network that maintains a second chain data structure for recording user data. The management node only accesses the first network. The management node includes a memory storing computer-executable instructions; and one or more processors. The one or more processors are configured to execute the computer-executable instructions such that the one or more processors are configured to receive a management request message sent by a requesting node; verify the management request message; and process the management request message in response to successful verification on the management request message. A data block in the first chain data structure is generated based on a result of the processing.

According to another aspect of the present disclosure, a non-transitory computer-readable recording medium having computer-executable instructions for execution by one or more processors is provided. The computer-executable instructions, when executed, cause the one or more processors to carry out a method for managing a consortium chain data structure network. The consortium chain data structure network includes a first network that maintains a first chain data structure for recording management data, and a second network that maintains a second chain data structure for recording user data. A management node for management consensus of the consortium chain data structure network only accesses the first network. The method includes receiving, by the management node, a management request message sent by a requesting node; verifying, by the management node, the management request message; and processing, by the management node, the management request message in response to successful verification on the management request message. A data block in the first chain data structure is generated based on a result of the processing.

BRIEF DESCRIPTION OF THE DRAWINGS

The above and other objects, features and advantages of the present disclosure will be further clarified the following detailed description of embodiments of the present disclosure in combination with the drawings.

DESCRIPTION OF THE EMBODIMENTS

Figure 1:
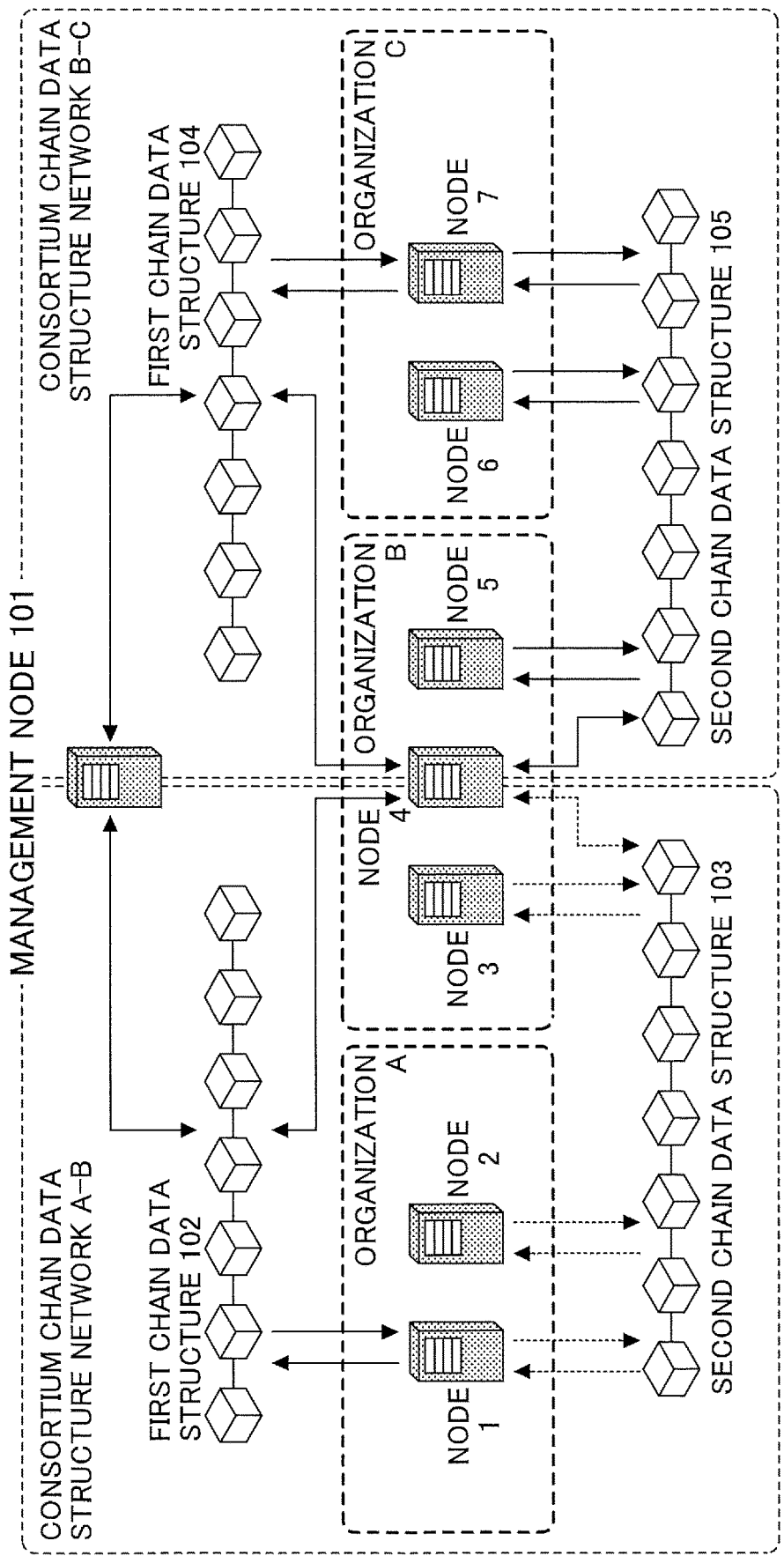
FIG. 1 is a schematic diagram illustrating an architecture of a consortium chain data structure network system according to an embodiment of the present disclosure.

In the following, the method for managing the consortium chain data structure network, the management node, and the non-transitory computer-readable recording medium according to the embodiments of the present invention will be described with reference to the accompanying drawings.

In the drawings, the same reference numbers refer to the same elements. It should be noted that, the embodiments described herein are illustrative only and are not intended to limit the scope of the present invention.

The present disclosure provides an overall architecture of a consortium chain data structure network. The consortium chain data structure network according to an embodiment of the present disclosure may include a first network that maintains a first chain data structure for recording management data, and a second network that maintains a second chain data structure for recording user data. A management node for implementing management consensus of the consortium chain data structure network only accesses the first network.

Generally speaking, a consortium chain data structure network is jointly created and maintained by a number of organizations that know identities of each other, and only consortium members are allowed to access data in the chain data structure. Thus, strict identity authentication and authority management on the nodes in the network are required. Generally, in order to establish a consortium chain data structure network, each organization needs to configure each node within the organization separately. However, such a consortium establishment method is inefficient and cannot support dynamically changing membership in the consortium.

The entire consortium chain data structure network according to the present disclosure is divided into the first network and the second network. Nodes in the first network update and maintain the first chain data structure that records the management data of the network, and nodes in the second network update and maintain the second chain data structure that records the user data. Only the nodes that access the first network have a right to participate in network management transactions and to access the management data, and only the nodes that access the second network have a right to participate in user transactions and to access the user data. Thus, the consortium chain data structure network according to the embodiment of the present disclosure can isolate the management data from the user data. The management node for collecting the management consensus of parties on the network only accesses the first network, thus the management node can only access the management data but not the user data, thereby improving the efficiency of reaching the management consensus and further guaranteeing the privacy and security of the user data.

FIG. 1 is a schematic diagram illustrating an architecture of a consortium chain data structure network system according to an embodiment of the present disclosure. A consortium chain data structure network A-B that is created and maintained by organizations A and B is shown in the left half of FIG. 1, and a consortium chain data structure network B-C that is created and maintained by organizations B and C is shown in the right half of FIG. 1. Taking the consortium chain data structure network A-B in the left half of FIG. 1 as an example, a node 1 in the organization A, a node 4 in the organization B, and a management node 101 constitute a first network that updates and maintains a first chain data structure 102, and have an authority to participate in management transactions of the consortium chain data structure network A-B and to access the management data. The node 1 and a node 2 in the organization A, and a node 3 and the node 4 in the organization B constitute a second network that updates and maintains a second chain data structure 103, and have an authority to participate in user transactions and to access the user data. The management node 101 for collecting the management consensus of the organization A and the organization B on the network only accesses the first network, thus the management node 101 can only access the management data but not the user data, thereby improving the privacy and security of the user data.

Although FIG. 1 only shows an example in which the entire consortium chain data structure network system includes two consortium chain data structure networks, optionally, the consortium chain data structure network system may include any number of consortium chain data structure networks. In addition, each consortium chain data structure network may also include two and more second networks and the respective second chain data structures, and the present disclosure is not limited to this example.

As an example, the consortium chain data structure networks and the chain data structures according to the embodiments of the present disclosure may be implemented based on blockchain technologies, such as Bitcoin blockchain technologies, Hyperledger Fabric blockchain technologies, Ethereum blockchain technologies and the like. The blockchain technology is a fusion technology in fields such as peer-to-peer communication, digital encryption, multi-party collaborative consensus algorithm, distributed ledger and the like, and has the characteristics such as immutability, traceability of data on the chain, and the like. In this example, the chain data structure may also be called blockchain, and the blockchain may be composed of one or more data blocks (or called blocks). The consortium chain data structure network formed by using a blockchain technology may be called a consortium blockchain network. The method for managing the consortium chain data structure network according to the embodiment of the present disclosure can safely and efficiently create a consortium and dynamically change membership in the consortium. Thus, the present disclosure may be applied to systems based on consortium blockchains, such as blockchain-based multi-party supply chain management systems, blockchain-based financial contract management systems across multiple companies, and blockchain-based customer resource management systems across multiple companies, and may provide consortium blockchain infrastructure for these application systems. In addition, the present disclosure may also be applied to the management of blockchain cloud platforms of BaaS (Blockchain as a Service).

In view of the problem of the conventional technology, an object of the embodiments of the present disclosure is to provide a method for managing a consortium chain data structure network, a management node, and a non-transitory computer-readable recording medium that improve the efficiency of reaching management consensus, further guarantee the privacy and security of user data, and effectively manage membership in a consortium.

Figure 2:
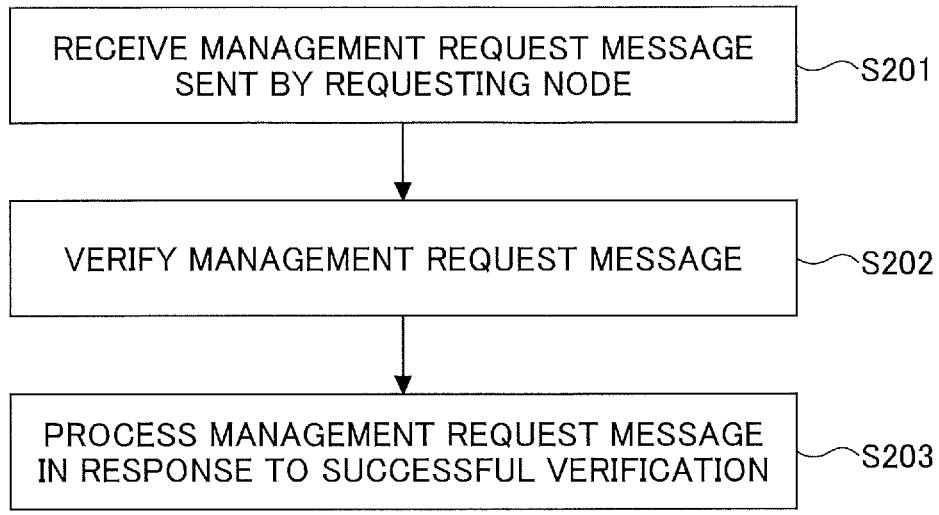
FIG. 2 is a flowchart illustrating a method for managing a consortium chain data structure network executed by a management node according to an embodiment of the present disclosure.

In an embodiment of the present disclosure, a method for managing a consortium chain data structure network is provided. FIG. 2 is a flowchart illustrating the method for managing the consortium chain data structure network executed by a management node according to the embodiment of the present disclosure. As shown in FIG. 2, in step S201, a management request message sent by a requesting node is received. Here, the management request message may be various types of request messages for requesting to create a consortium or to change membership in the consortium. The specific processing for different types of request messages will be described in detail below.

In step S202, the management request message is verified.

In an example, the management node may issue a node digital certificate to the requesting node in advance. When verifying the management request message, a digital signature included in the management request message may be verified using the node digital certificate.

Specifically, the management node according to the embodiment of the present disclosure may have a function of issuing a certificate for the node, so as to issue the node digital certificate for each requesting node in advance. Subsequently, when the requesting node generates the management request message, a digital signature may be generated for the message content using a private key corresponding to the node digital certificate, and the management request message including the digital signature may be transmitted. After receiving the management request message, the management node may verify the digital signature included in the management request message using a public key included in the node digital certificate. If the verification is successful, the management request message may be further processed, and if the verification fails, the management request message may be discarded. Accordingly, by issuing the digital certificate, authority to send a valid request message can be given to potential requesting nodes, and the management node can determine whether the request message comes from a trusted node by verifying the digital signature.

In an example, the management node may be controlled by the manufacturer of the consortium chain data structure node, so as to issue a node digital certificate for each of the manufactured nodes during a manufacturing process. An existing public key infrastructure (PKI) technology may be used to implement the issuance and management of the node digital certificate. The issued node digital certificate according to the embodiment of the present disclosure may include information of the node holding the certificate, such as a name of node, a domain name, an IP address, a public key, a node unique identifier (UID), and the like, and the node digital certificate is not limited the above information.

Optionally, each organization may have at least one intermediate node capable of issuing a node digital certificate for other nodes in the same organization. In this case, the management node may issue an intermediate certificate for the intermediate node within each organization, so that the intermediate node issues node digital certificates for other nodes in the same organization. In this example, the management node may generate a root certificate, and may establish a trust chain relationship among the root certificate, the intermediate certificate, and the node digital certificate, so as to implement a trace from the node digital certificate to the intermediate certificate and a trace from the intermediate certificate to the root certificate, thereby verifying the validity of the node digital certificate.

In step S203, the management request message is processed in response to successful verification on the management request message. Here, a data block in the first chain data structure is generated based on a result of the processing in this step. Accordingly, various types of the management request messages may be processed, and the management data may be recorded in the first chain data structure based on the result of the processing, so as to prevent the management data of the network from being tampered by using the immutability characteristics of the chain data structure itself, thereby preventing malicious nodes accessing the user data and improving the security of the user data of the consortium members. For example, when the membership of the consortium changes, a data block containing a new member list may be generated in the first chain data structure, so as to prevent the member list from being tampered, thereby preventing malicious nodes accessing the network and reducing the security risk of the user data. In addition, the management node for receiving and processing the management request message only accesses the first network, thus the management node can only access the management data recorded in the first chain data structure, but cannot access the user data. Thus, the efficiency of reaching the management consensus of the network can be improved, and the privacy and security of the user data can be further guaranteed.

In the following, taking different types of the management request messages received by the management node as examples, the method for managing the consortium chain data structure network according to the embodiment of the present disclosure will be described in detail.

Figure 3:
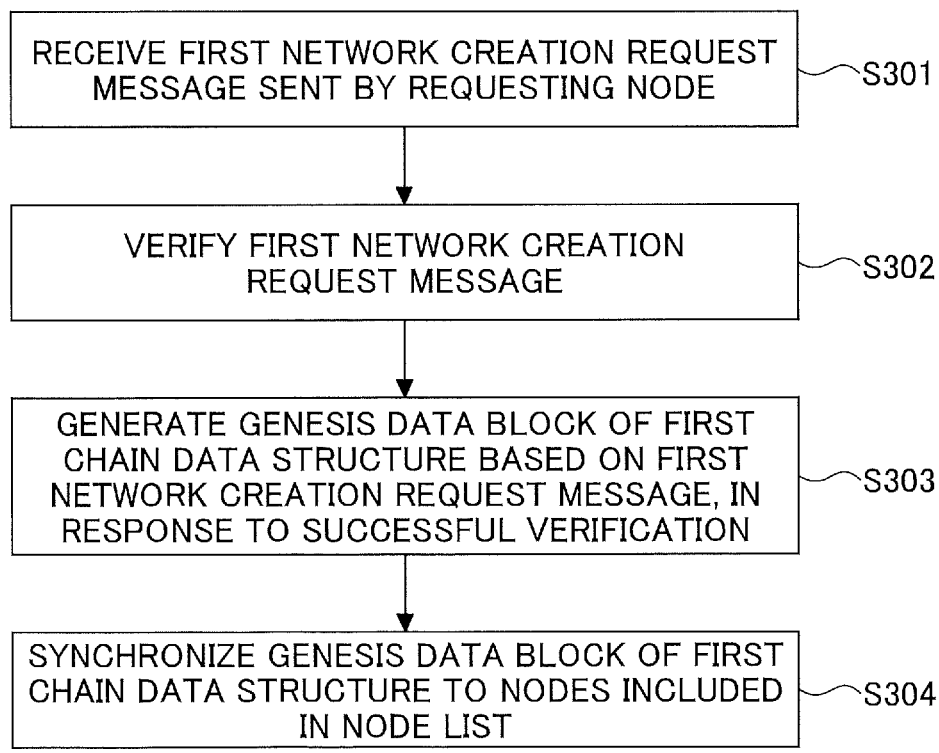
FIG. 3 is a flowchart illustrating a method for creating a consortium according to the embodiment of the present disclosure.

FIG. 3 is a flowchart illustrating a method for creating a consortium according to the embodiment of the present disclosure.

In step S301, a first network creation request message sent by a requesting node is received.

Specifically, the requesting node may create the consortium by sending the first network creation request message as the management request message to the management node. In this example, the first network creation request message may include a node list, so as to request to add the nodes in the node list to the created consortium. Note that the first network creation request message according to the embodiment of the present disclosure may also include other information, such as a name of a consortium to be established, a timestamp, an organization unique identifier of an organization to which the node belongs, and the like.

In an example, the nodes in the node list may include the requesting node itself and other nodes that belong to the same organization as the requesting node. In another example, the nodes in the node list may also include nodes that belong to a different organization from the requesting node. For example, several organizations may have previously reached an entity-based consortium relationship offline. In this case, the request nodes controlled by one of the organizations may cause the nodes of the organizations to join the created consortium together. Preferably, each organization may have only one node included in the node list, so that only one node of each organization joins the first network and participates in management transactions, thereby restricting the number of member nodes in the first network and improving the efficiency of reaching the management consensus.

In step S302, the first network creation request message is verified.

In this step, after receiving the first network creation request message sent by the requesting node, the management node may verify the digital signature included in the first network creation request message in the process described in step S202, so that the first network creation request message is further processed in response to successful verification.

In step S303, a genesis data block of the first chain data structure is generated based on the first network creation request message, in response to successful verification.

Generally speaking, the earliest constructed data block in the chain data structure may be called the genesis data block (also called a genesis block). The management node may allocate a consortium unique identifier for a consortium to be established in response to successful verification, so as to generate the genesis data block of the created first chain data structure. Here, the genesis data block records the allocated consortium unique identifier, and various information (for example, a node list, etc.) included in the first network creation request message.

Preferably, after receiving the first network creation request message, the management node may update the node list included in the first network creation request message to add the management node itself to the node list, so that the management node also accesses the first network and participates in management transactions. In this case, the genesis data block may include an updated node list, and the updated node list is obtained by adding the management node to the node list included in the first network creation request message.

In step S304, the genesis data block of the first chain data structure is synchronized to nodes included in the node list.

In this step, after receiving the genesis data block, the nodes in the node list may determine that the consortium creation has been completed. In addition, after receiving the genesis data block, the nodes may also start to locally maintain a first network member list based on the member list included in the genesis data block. Here, the first network member list may be used to implement access control on the first network, thereby further improving the security of the user data of the consortium. Specifically, after receiving a management transaction that is broadcast in the first network, a member node in the first network may determine whether the node that sent the corresponding request message is included in the first network member list, based on the locally maintained first network member list. Then, if it is determined that the node that sent the request message is included in the first network member list, the management transaction is processed, and if it is determined that the node that sent the request message is not included in the first network member list, the management transaction is discarded.

Figure 4:
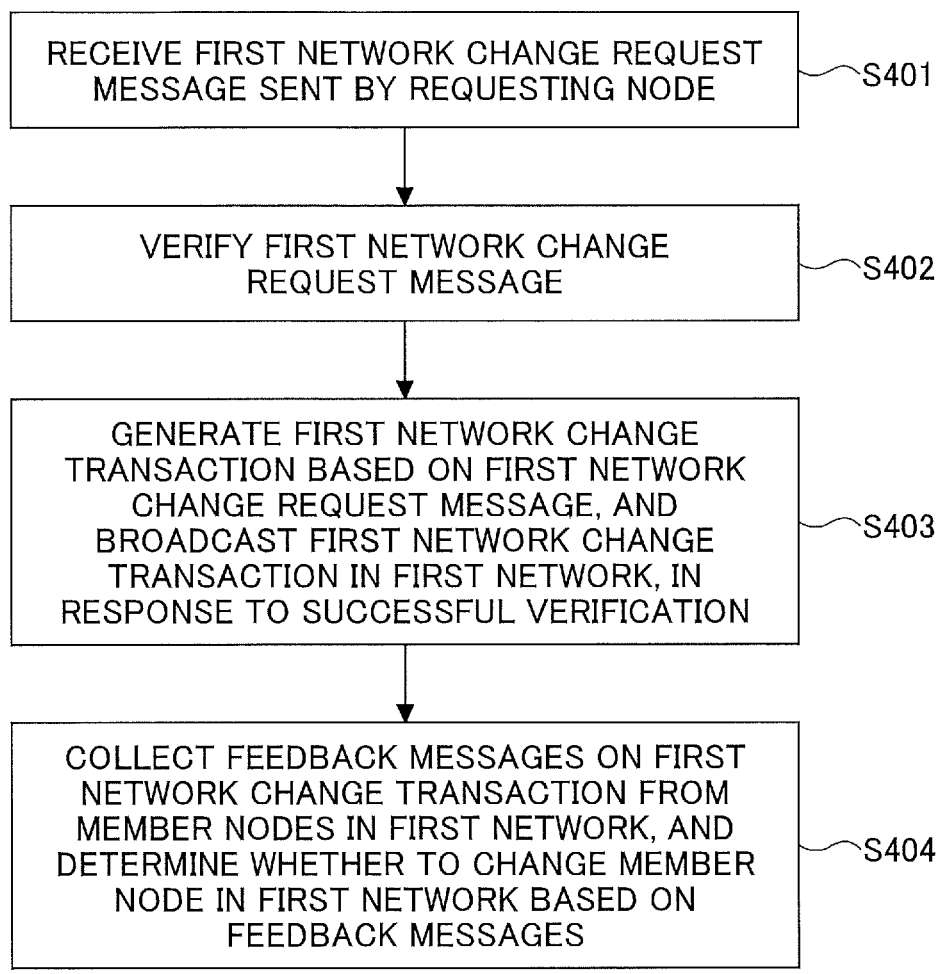
FIG. 4 is a flowchart illustrating a method for joining or leaving a consortium according to the embodiment of the present disclosure.

FIG. 4 is a flowchart illustrating a method for joining or leaving a consortium according to the embodiment of the present disclosure.

In step S401, a first network change request message sent by a requesting node is received.

Specifically, the requesting node may send the first network change request message as the management request message to the management node, so that the requesting node joins or leaves the consortium. Here, the first network change request message may include a consortium unique identifier of a consortium that the requesting node wishes to join or leave. Optionally, the first network change request message may also include other information, such as an organization unique identifier of an organization to which the node belongs, a timestamp, and the like, but is not limited such information.

In step S402, the first network change request message is verified.

In this step, after receiving the first network change request message sent by the requesting node, the management node may verify the digital signature included in the first network change request message in the process described in step S202, so that the first network change request message is further processed in response to successful verification.

In step S403, a first network change transaction is generated based on the first network change request message, and the first network change transaction is broadcast in the first network, in response to successful verification.

In this step, preferably, the management node may obtain the updated first network member list by adding the requesting node to the current first network member list or deleting the requesting node from the current first network member list, and may add the updated first network member list to the first network change transaction. Note that the first network change transaction according to the embodiment of the present disclosure may also include various information included in the first network change request message, such as an organization unique identifier of an organization to which the node belongs, a timestamp, and the like.

In an example, the management node may issue a node digital certificate for itself. And then, when generating the first network change transaction, the management node may generate a digital signature for the transaction content using a private key corresponding to the node digital certificate, and may send the first network change transaction including the digital signature. After receiving the first network change transaction, the member nodes in the first network may verify the digital signature in the first network change transaction using a public key included in the node digital certificate of the management node, and may determine to process or discard the transaction based on the verification result. In the following, after receiving any type of management transaction that are broadcast by the management node, the member nodes in the first network may verify the digital signature included in the management transaction, and details will not be described later.

In step S404, one or more feedback messages on the first network change transaction from one or more member nodes in the first network are collected, and it is determined whether to change a member node in the first network based on the feedback messages.

In this step, after receiving the first network change transaction, the member nodes in the first network may decide to approve or reject the first network change transaction, so as to generate corresponding feedback messages that indicate approval or rejection and send the feedback messages to the management node.

In addition, in another example, if the member node in the first network approves the first network change transaction, the member node may generate a feedback message indicating approval, and if the member node rejects the first network change transaction, the member node may directly discard the transaction. In this example, if the member node approves the first network change transaction, the member node may generate a digital signature for the first network change transaction, and may send the first network change transaction including the digital signature as the feedback message indicating approval.

In an example, when determining whether to change the member node in the first network, the received feedback messages may be used as input of a first smart contract. Here, a data block including the first network change transaction is generated in the first chain data structure using the first smart contract, in response to determining to change the member node in the first network. As those skilled in the art are well-known, the smart contract is automatic script codes used to implement a rule agreed by all parties. If a trigger condition is met, the smart contract can automatically process input based on an agreed rule and record an obtained processing result in a chain data structure. In an example, an operation of generating a new data block may be executed by a node running the smart contract, so as to record the processing result in the chain data structure. In another example, the node running the smart contract may also send the processing result to other nodes for block production (for example, an order node in a Hyperledger Fabric blockchain, a miner node in a Bitcoin blockchain, etc.), so that other nodes other than the node running the smart contract can perform the operation of generating new data blocks. Note that the present disclosure is not limited to the above examples.

In this example, the management node may collect the feedback messages sent by member nodes in the first network within a predetermined period, and may use the feedback messages as the input of the first smart contract. Here, in the first smart contract, it may be defined that if a predetermined number of valid feedback messages indicating approval are received within a predetermined period, it is determined to change the member node in the first network, add an operation result of the first smart contract to the first network change transaction, and generate the data block including the first network change transaction in the first chain data structure.

Here, a digital signature may be included in the feedback message so as to be verified, and it may be determined that the feedback message is a valid feedback message if the verification is successful. Optionally, in a case where the requesting node requests to leave the consortium, the above predetermined number may be set to zero in the first smart contract, so that the requesting node can leave the consortium without the approval of other consortium members.

In a case where it is determined to change the member node in the first network, the data block generated in the first chain data structure may be synchronized to the requesting node, so as to notify the requesting node that the requesting node has successfully joined the consortium or left the consortium. In addition, the data block may also be synchronized to the member nodes in the first network, so that the member nodes can update the locally maintained first network member list accordingly.

In a case where it is determined not to change the member node in the first network based on the feedback messages, the management node may send a failure notification message to the requesting node to notify the requesting node that the requesting node has not successfully joined the consortium or left the consortium. Optionally, the management node may send the failure notification message including a node list composed of nodes that have not sent a feedback message indicating approval, so that the requesting node can know the identities of the nodes that refuse to let the requesting node join or leave the consortium.

In this way, the method for managing the consortium chain data structure network according to the embodiment of the present disclosure can support dynamically changing membership in the consortium. Furthermore, only in a case where all existing organizations in the consortium have reached a consensus to allow a new organization node to join the consortium, the new organization node can be allowed to join the consortium, thereby further improving the security of the user data.

In addition, the requesting node that have joined the consortium via the first network change request message can access the first network and participate in the management transactions of the entire consortium chain data structure network. For example, after the requesting node becomes a member node of the first network, the requesting node may send various types of management request messages to the management node (for example, a message for requesting to create a second network in the consortium, or a message for requesting to allow another node to join an established second network), the relevant details thereof will be described in detail below.

Figure 5:
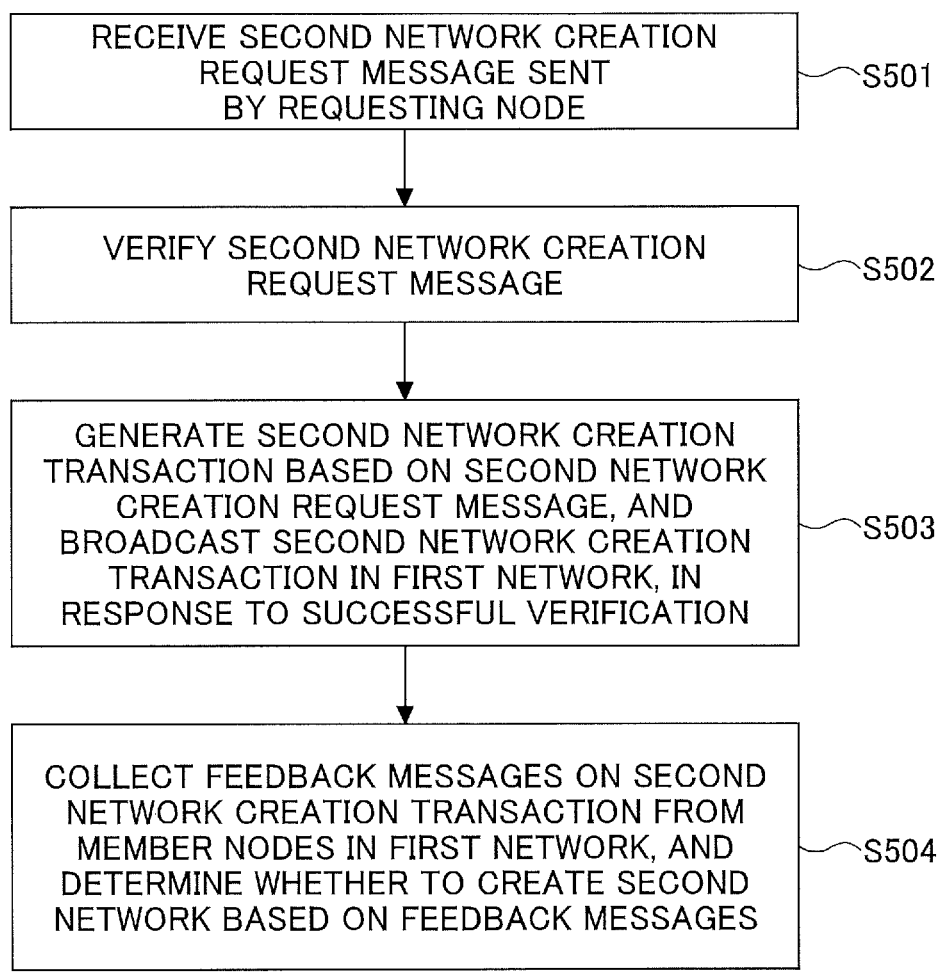
FIG. 5 is a flowchart illustrating a method for creating a second network in a consortium according to the embodiment of the present disclosure.

FIG. 5 is a flowchart illustrating a method for creating a second network in a consortium according to the embodiment of the present disclosure.

In step S501, a second network creation request message sent by a requesting node is received.

Specifically, the requesting node may create a second network in the consortium and create a corresponding second chain data structure by sending the second network creation request message as the management request message to the management node. Here, the second network creation request message may include a node list, so as to request to add the nodes in the node list to the created second network. Note that the second network creation request message according to the embodiment of the present disclosure may also include other information, such as a name of a second chain data structure to be created, a timestamp, an adopted consensus algorithm, and the like, but the present disclosure is not limited to the above information.

In an example, the nodes in the node list may include not only the requesting node itself, but also other nodes belonging to the same organization as the requesting node, so that the requesting node can cause one or more other nodes of the same organization join the created second network together and participate in user transactions.

In step S502, the second network creation request message is verified.

In this step, after receiving the second network creation request message sent by the requesting node, the management node may verify the digital signature included in the second network creation request message in the process described in step S202, so that the second network creation request message is further processed in response to successful verification.

In an example, the management node may locally maintain a first network member list based on the data block in the first chain data structure. If the above verification on the digital signature is successful, the management node may further verify an identity of the requesting node that sent the second network creation request message using the first network member list. Correspondingly, the management node may generate a second network creation transaction if it is determined that the requesting node is a member of the first network, and may discard the second network creation request message if it is determined that the requesting node is not a member of the first network. By verifying the identity of the requesting node in the above process, only members of the first network who access the first network and have a right to participate in management transactions are allowed to send a valid second network creation request message, thereby preventing nodes outside the consortium arbitrarily tampering the membership in the network and affecting the user data.

In the following, when receiving other request messages other than the management request message for creating a consortium (for example, the first network creation request message) or the management request message for joining the consortium (for example, the first network change request message), the management node may also verify an identity of a requesting node using the first network member list, and the detailed description thereof will be omitted here.

In step S503, a second network creation transaction is generated based on the second network creation request message and the second network creation transaction is broadcast in the first network, in response to successful verification.

If the above verification is successful, the management node may allocate a chain unique identifier for a second chain data structure to be created, so as to generate the second network creation transaction and broadcast the second network creation transaction in the first network that is accessed by the requesting node. Here, the second network creation transaction may include the allocated chain unique identifier and various information (for example, a node list, etc.) included in the second network creation request message.

In step S504, one or more feedback messages on the second network creation transaction from one or more member nodes in the first network are collected, and it is determined whether to create a second network based on the feedback messages.

In this step, the member nodes in the first network may decide to approve or reject the second network creation transaction, and send a feedback message for the second network creation transaction in a similar manner as described above. For example, the member nodes may send the second network creation transaction including a digital signature as the feedback message indicating approval.

In an example, the management node may collect the feedback messages sent by member nodes in the first network within a predetermined period, and may use the feedback messages as the input of the second smart contract. Here, a data block including the second network creation transaction is generated in the first chain data structure using the second smart contract, in response to determining to create the second network.

Specifically, in the second smart contract, it may be defined that if a predetermined number of valid feedback messages indicating approval are received within a predetermined period, it is determined to create a second network, add an operation result of the second smart contract to the second network creation transaction, and generate the data block including the second network creation transaction in the first chain data structure. Here, a digital signature may be included in the feedback message so as to be verified, and it may be determined that the feedback message is a valid feedback message if the verification is successful.

In a case where it is determined to create the second network, the generated data block including the second network creation transaction may be synchronized at the member nodes in the first network. After receiving the data block including the second network creation transaction, the requesting node serving as a member of the first network may generate a genesis data block of the created second chain data structure, and synchronize the genesis data block to other nodes in the node list, so as to complete the operations of creating the second network and creating the second chain data structure. Here, the genesis data block may record a consortium unique identifier, a chain unique identifier, and various information (for example, a consensus algorithm, a node list, etc.) included in the second network creation request message. In this process, the genesis data block of the second chain data structure is generated by the requesting node but not the management node, thus it is possible to prevent malicious tampering with the node list after the management node is hacked, thereby further ensuring the privacy and security of the user data.

In addition, after obtaining the genesis data block of the second chain data structure, the nodes in the node list may also start to locally maintain a second network member list based on the member list included in the genesis data block. Here, the second network member list may be used to implement access control on the second network, thereby further improving the security of the user data of the consortium. Specifically, after receiving a user transaction that is broadcast in the second network, a member node in the second network may determine whether the node that sent the corresponding request message is included in the second network member list, based on the locally maintained second network member list. Then, if it is determined that the node that sent the request message is included in the second network member list, the user transaction is processed, and if it is determined that the node that sent the request message is not included in the second network member list, the user transaction is discarded. In a case where the nodes access two and more second networks and participate in the maintenance of different second chain data structures, the nodes may locally store information such as names and chain unique identifiers of the second chain data structures corresponding to the respective second network member lists, so as to distinguish the different second network member lists.

Figure 6:
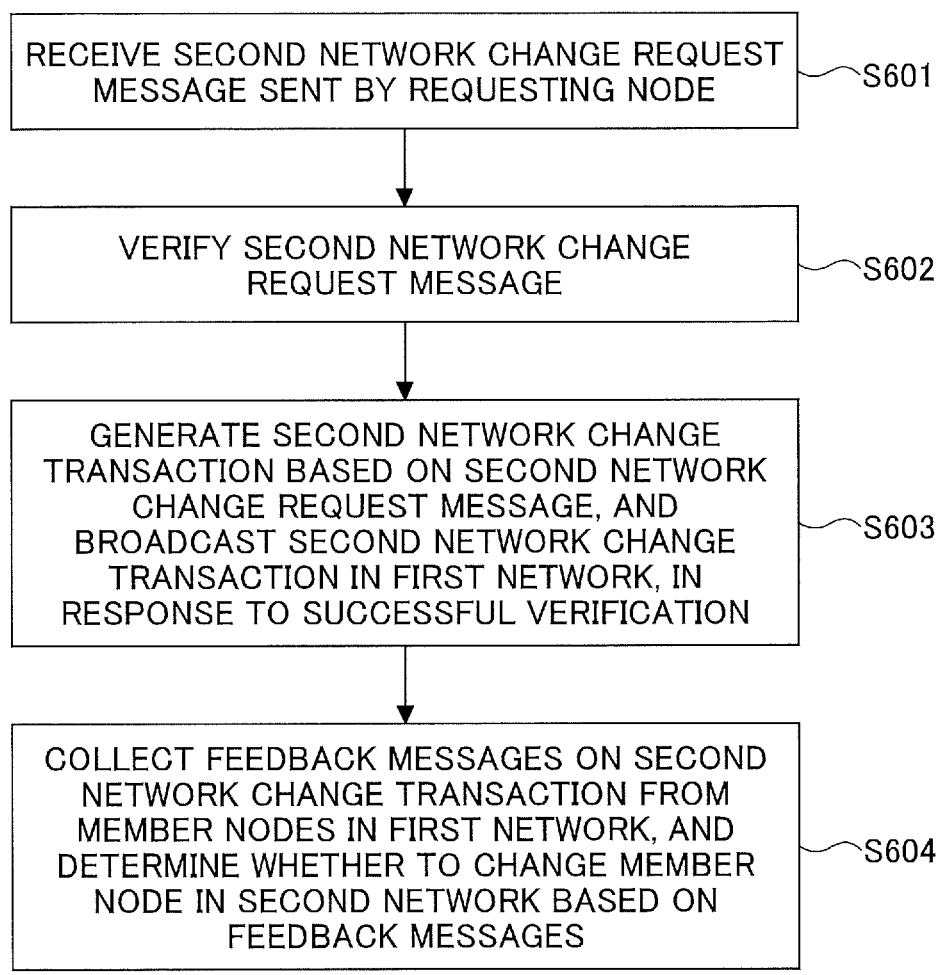
FIG. 6 is a flowchart illustrating a method for joining or leaving a second network that is created in a consortium according to the embodiment of the present disclosure.

FIG. 6 is a flowchart illustrating a method for joining or leaving a second network that is created in a consortium according to the embodiment of the present disclosure.

In step S601, a second network change request message sent by a requesting node is received.

Specifically, the requesting node may send the second network change request message as the management request message to the management node, so that the requesting node joins or leaves the second network. Here, the requesting node as a member of the first network may access the management data in the first chain data structure and obtain information about the second networks established in the consortium, so as to select one or more second networks to join. The second network change request message according to the embodiment of the present disclosure may include the name of the second chain data structure, a timestamp, a node list, and the like, and the present disclosure is not limited to such information. Similarly, the nodes in the node list may include not only the requesting node itself, but also other nodes that belong to the same organization as the requesting node, so that the requesting node can cause one or more other nodes of the same organization to join or leave the second network.

In step S602, the second network change request message is verified.

In this step, the management node may verify a digital signature included in the received second network change request message and an identity of the requesting node in a process similar to the above. Then, the management node may generate the second network change transaction in response to successful verification. For example, the management node may verify the identity of the requesting node based on the first network member list, so that only members of the first network who access the first network and have a right to participate in management transactions are allowed to send a valid second network change request message.

In step S603, a second network change transaction is generated based on the second network change request message, and the second network change transaction is broadcast in first network, in response to successful verification.

Preferably, the management node may obtain the updated second network member list by adding the nodes in the node list to the current second network member list or deleting the nodes from the current second network member list, and may add the updated second network member list to the second network change transaction. Note that the second network change transaction according to the embodiment of the present disclosure may also include various information included in the second network change request message, such as the name of the second chain data structure, a timestamp, and the like.

In step S604, one or more feedback messages on the second network change transaction from one or more member nodes in the first network are collected, and it is determined whether to change a member node in the second network based on the feedback messages.

In this step, the member nodes in the first network may decide to approve or reject the second network change transaction, and send the feedback messages for the second network change transaction in a similar manner as described above. For example, the member node may send the second network change transaction including a digital signature as the feedback message indicating approval.

In an example, the management node may collect the feedback messages sent by member nodes in the first network within a predetermined period, and may use the feedback messages as the input of the second smart contract. Here, a data block including the second network change transaction is generated in the first chain data structure using the second smart contract, in response to determining to change a member node in the second network.

Specifically, in the second smart contract, it may be defined that if a predetermined number of valid feedback messages indicating approval are received within a predetermined period, it is determined to change the member node in the second network, add an operation result of the second smart contract to the second network change transaction, and generate the data block including the second network change transaction in the first chain data structure. Here, a digital signature may be included in the feedback message so as to be verified, and it may be determined that the feedback message is a valid feedback message if the verification is successful.

In a case where it is determined to change the second network, the generated data block including the second network change transaction may be synchronized at the member nodes in the first network, so as to complete the change of the member in the second network. Preferably, after obtaining the data block including the second network change transaction, a member node that accesses both the first network and one or more second networks may update the second network member list that is locally maintained, based on the data block, and may send the updated second network member list to other member nodes of the same organization that only access the second network, so as to update the second network member list maintained by the member nodes of the same organization that only access the second network.

The method for managing the consortium chain data structure network according to the embodiment of the present disclosure can isolate the management data from the user data. The management node only has the authority to access the management data. Thus, it is possible to improve the efficiency of reaching the management consensus using the management node, thereby further guaranteeing the privacy and security of the user data. In addition, the managing method can also support dynamically changing membership in the consortium based on the consensus of all parties in the network. Furthermore, only in a case where all existing organizations in the consortium have reached a consensus to allow a new organization node to join the consortium, the new organization node can be allowed to join the consortium, thereby further improving the security of the user data. Additionally, in the managing method, various types of the management data including the updated member list is recorded in the first chain data structure, thus it is possible to prevent the management data of the consortium from being tampered by using the immutability characteristics of the chain data structure itself, thereby preventing malicious nodes accessing the user data and improving the security of the user data of the consortium members.

Figure 7:
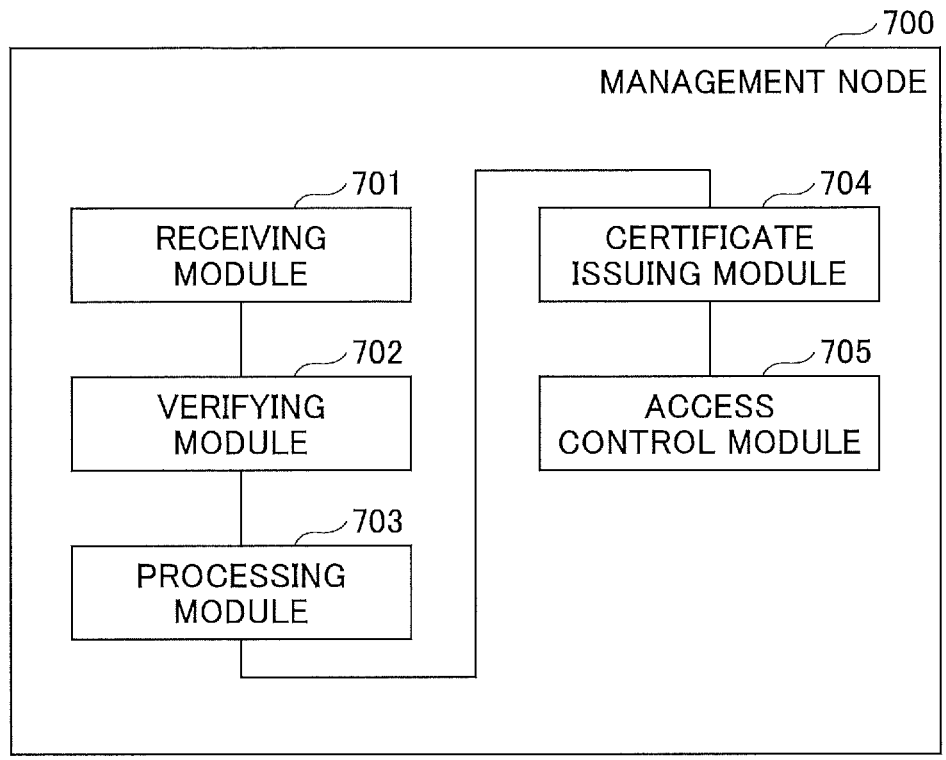
FIG. 7 is a schematic block diagram illustrating a management node according to another embodiment of the present disclosure.

In another embodiment of the present disclosure, a management node for management consensus of a consortium chain data structure network is further provided. FIG. 7 is a schematic block diagram illustrating the management node according to the embodiment of the present disclosure. The consortium chain data structure network may include a first network that maintains a first chain data structure for recording management data, and a second network that maintains a second chain data structure for recording user data. The management node only accesses the first network.

As shown in FIG. 7, the management node 700 may include a receiving module 701, a verifying module 702, a processing module 703, a certificate issuing module 704, and an access control module 705.

In the embodiment of the present disclosure, the receiving module 701 may receive a management request message sent by a requesting node. Here, the management request message may be various types of request messages for requesting to create a consortium or to change membership in the consortium. The specific processing for different types of request messages will be described in detail below.

The verifying module 702 may verify the management request message.

In an example, the certificate issuing module 704 may issue a node digital certificate to the requesting node in advance. When verifying the management request message, the certificate issuing module 704 may verify a digital signature included in the management request message using the node digital certificate.

Specifically, the certificate issuing module 704 may issue the node digital certificate for each requesting node in advance. Subsequently, when the requesting node generates the management request message, a digital signature may be generated for the message content using a private key corresponding to the node digital certificate, and the management request message including the digital signature may be transmitted. After receiving the management request message, the verifying module 702 may verify the digital signature included in the management request message using a public key included in the node digital certificate. If the verification is successful, the processing module 703 may further process the management request message, and if the verification fails, the processing module 703 may discard the management request message. Accordingly, by issuing the digital certificate, authority to send a valid request message can be given to potential requesting nodes, and the management node can determine whether the request message comes from a trusted node by verifying the digital signature.

Optionally, each organization may have at least one intermediate node capable of issuing a node digital certificate for other nodes in the same organization. In this case, the certificate issuing module 704 may issue an intermediate certificate for the intermediate node within each organization, so that the intermediate node issues node digital certificates for other nodes in the same organization. In this example, the certificate issuing module 704 may generate a root certificate, and may establish a trust chain relationship among the root certificate, the intermediate certificate, and the node digital certificate, so as to implement a trace from the node digital certificate to the intermediate certificate and a trace from the intermediate certificate to the root certificate, thereby verifying the validity of the node digital certificate.

The processing module 703 may process the management request message in response to successful verification on the management request message. Here, a data block in the first chain data structure is generated based on a result of the processing. Accordingly, the processing module 703 may process the various types of the management request messages, and may record the management data in the first chain data structure based on the result of the processing, so as to prevent the management data of the network from being tampered by using the immutability characteristics of the chain data structure itself, thereby preventing malicious nodes accessing the user data and improving the security of the user data of the consortium members. For example, when the membership of the consortium changes, a data block containing a new member list may be generated in the first chain data structure, so as to prevent the member list from being tampered, thereby preventing malicious nodes accessing the network and reducing the security risk of the user data. In addition, the management node 700 for receiving and processing the management request message only accesses the first network, thus the management node 700 can only access the management data recorded in the first chain data structure, but cannot access the user data. Thus, the efficiency of reaching the management consensus of the network can be improved, and the privacy and security of the user data can be further guaranteed.

In the following, taking different types of the management request messages received by the management node 700 as examples, the operations of the management node 700 according to the embodiment of the present disclosure will be described in detail.

The management node 700 may implement the processing for creating a consortium according to the embodiment of the present disclosure as shown in FIG. 3.

In this process, the receiving module 701 receives a first network creation request message sent by a requesting node.

Specifically, the requesting node may create the consortium by sending the first network creation request message as the management request message to the management node 700. In this example, the first network creation request message may include a node list, so as to request to add the nodes in the node list to the created consortium. Note that the first network creation request message according to the embodiment of the present disclosure may also include other information, such as a name of a consortium to be established, a timestamp, an organization unique identifier of an organization to which the node belongs, and the like.

In an example, the nodes in the node list may include the requesting node itself and other nodes that belong to the same organization as the requesting node. In another example, the nodes in the node list may also include nodes that belong to a different organization from the requesting node. For example, several organizations may have previously reached an entity-based consortium relationship offline. In this case, the request nodes controlled by one of the organizations may cause the nodes of the organizations to join the created consortium together. Preferably, each organization may have only one node included in the node list, so that only one node of each organization joins the first network and participates in management transactions, thereby restricting the number of member nodes in the first network and improving the efficiency of reaching the management consensus.

The verifying module 702 verifies the first network creation request message.

Here, the verifying module 702 may verify the digital signature included in the first network creation request message in the process described in step S202, so that the first network creation request message is further processed in response to successful verification.

The processing module 703 generates a genesis data block of the first chain data structure based on the first network creation request message, in response to successful verification.

Generally speaking, the earliest constructed data block in the chain data structure may be called the genesis data block (also called a genesis block). The processing module 703 may allocate a consortium unique identifier for a consortium to be established in response to successful verification, so as to generate the genesis data block of the created first chain data structure. Here, the genesis data block records the allocated consortium unique identifier, and various information (for example, a node list, etc.) included in the first network creation request message.

Preferably, the processing module 703 may update the node list included in the first network creation request message to add the management node 700 itself to the node list, so that the management node 700 also accesses the first network and participates in management transactions. In this case, the genesis data block may include an updated node list, and the updated node list is obtained by adding the management node 700 to the node list included in the first network creation request message.

The processing module 703 synchronizes the genesis data block of the first chain data structure to nodes included in the node list.

Here, after receiving the genesis data block, the nodes in the node list may determine that the consortium creation has been completed. In addition, after receiving the genesis data block, the nodes may also start to locally maintain a first network member list based on the member list included in the genesis data block. Here, the first network member list may be used to implement access control on the first network, thereby further improving the security of the user data of the consortium. Specifically, after receiving a management transaction that is broadcast in the first network, a member node in the first network may determine whether the node that sent the corresponding request message is included in the first network member list, based on the locally maintained first network member list. Then, if it is determined that the node that sent the request message is included in the first network member list, the management transaction is processed, and if it is determined that the node that sent the request message is not included in the first network member list, the management transaction is discarded.

The management node 700 may also implement the processing for joining or leaving the consortium as shown in FIG. 4 according to the embodiment of the present disclosure.

In this process, the receiving module 701 receives a first network change request message sent by a requesting node.

Specifically, the requesting node may send the first network change request message as the management request message to the management node, so that the requesting node joins or leaves the consortium. Here, the first network change request message may include a consortium unique identifier of a consortium that the requesting node wishes to join or leave. Optionally, the first network change request message may also include other information, such as an organization unique identifier of an organization to which the node belongs, a timestamp, and the like, but is not limited such information.

The verifying module 702 verifies the first network change request message.

The verifying module 702 may verify the digital signature included in the first network change request message in the process described in step S202, so that the first network change request message is further processed in response to successful verification.

The processing module 703 generates a first network change transaction is based on the first network change request message, and broadcast the first network change transaction in the first network, in response to successful verification.

Here, preferably, the processing module 703 may obtain the updated first network member list by adding the requesting node to the current first network member list or deleting the requesting node from the current first network member list, and may add the updated first network member list to the first network change transaction. Note that the first network change transaction according to the embodiment of the present disclosure may also include various information included in the first network change request message, such as an organization unique identifier of an organization to which the node belongs, a timestamp, and the like.

In an example, the management node 700 may issue a node digital certificate for itself by the certificate issuing module. And then, when generating the first network change transaction, the management node 700 may generate a digital signature for the transaction content using a private key corresponding to the node digital certificate, and may send the first network change transaction including the digital signature. After receiving the first network change transaction, the member nodes in the first network may verify the digital signature in the first network change transaction using a public key included in the node digital certificate of the management node, and may determine to process or discard the transaction based on the verification result. In the following, after receiving any type of management transaction that are broadcast by the management node, the member nodes in the first network may verify the digital signature included in the management transaction, and details will not be described later.

The processing module 703 collects one or more feedback messages on the first network change transaction from one or more member nodes in the first network are collected, determines whether to change a member node in the first network based on the feedback messages.

Here, after receiving the first network change transaction, the member nodes in the first network may decide to approve or reject the first network change transaction, so as to generate corresponding feedback messages that indicate approval or rejection and send the feedback messages to the management node.

In addition, in another example, if the member node in the first network approves the first network change transaction, the member node may generate a feedback message indicating approval, and if the member node rejects the first network change transaction, the member node may directly discard the transaction. In this example, if the member node approves the first network change transaction, the member node may generate a digital signature for the first network change transaction, and may send the first network change transaction including the digital signature as the feedback message indicating approval.

In an example, when determining whether to change the member node in the first network, the processing module 703 uses the received feedback messages as input of a first smart contract. Here, a data block including the first network change transaction is generated in the first chain data structure using the first smart contract, in response to determining to change the member node in the first network. As those skilled in the art are well-known, the smart contract is automatic script codes used to implement a rule agreed by all parties. If a trigger condition is met, the smart contract can automatically process input based on an agreed rule and record an obtained processing result in a chain data structure. In an example, an operation of generating a new data block may be executed by a node running the smart contract, so as to record the processing result in the chain data structure. In another example, the node running the smart contract may also send the processing result to other nodes for block production (for example, an order node in a Hyperledger Fabric blockchain, a miner node in a Bitcoin blockchain, etc.), so that other nodes other than the node running the smart contract can perform the operation of generating new data blocks. Note that the present disclosure is not limited to the above examples.

In this example, the processing module 703 may collect the feedback messages sent by member nodes in the first network within a predetermined period, and may use the feedback messages as the input of the first smart contract. Here, in the first smart contract, it may be defined that if a predetermined number of valid feedback messages indicating approval are received within a predetermined period, it is determined to change the member node in the first network, add an operation result of the first smart contract to the first network change transaction, and generate the data block including the first network change transaction in the first chain data structure. Here, a digital signature may be included in the feedback message so as to be verified, and it may be determined that the feedback message is a valid feedback message if the verification is successful. Optionally, in a case where the requesting node requests to leave the consortium, the above predetermined number may be set to zero in the first smart contract, so that the requesting node can leave the consortium without the approval of other consortium members.

In a case where it is determined to change the member node in the first network, the data block generated in the first chain data structure may be synchronized to the requesting node, so as to notify the requesting node that the requesting node has successfully joined the consortium or left the consortium. In addition, the data block may also be synchronized to the member nodes in the first network, so that the member nodes can update the locally maintained first network member list accordingly.

In a case where it is determined not to change the member node in the first network based on the feedback messages, the processing module 703 may send a failure notification message to the requesting node to notify the requesting node that the requesting node has not successfully joined the consortium or left the consortium. Optionally, the processing module 703 may send the failure notification message including a node list composed of nodes that have not sent a feedback message indicating approval, so that the requesting node can know the identities of the nodes that refuse to let the requesting node join or leave the consortium.

In this way, the management node 700 according to the embodiment of the present disclosure can support dynamically changing membership in the consortium. Furthermore, only in a case where all existing organizations in the consortium have reached a consensus to allow a new organization node to join the consortium, the new organization node can be allowed to join the consortium, thereby further improving the security of the user data.

In addition, the requesting node that have joined the consortium via the first network change request message can access the first network and participate in the management transactions of the entire consortium chain data structure network. For example, after the requesting node becomes a member node of the first network, the requesting node may send various types of management request messages to the management node (for example, a message for requesting to create a second network in the consortium, or a message for requesting to allow another node to join an established second network), the relevant details thereof will be described in detail below.

The management node 700 may also implement the processing for creating a second network in the consortium according to the embodiment of the present disclosure as shown in FIG. 5.

In this process, the receiving module 701 receives a second network creation request message sent by a requesting node.

Specifically, the requesting node may create a second network in the consortium and create a corresponding second chain data structure by sending the second network creation request message as the management request message to the management node. Here, the second network creation request message may include a node list, so as to request to add the nodes in the node list to the created second network. Note that the second network creation request message according to the embodiment of the present disclosure may also include other information, such as a name of a second chain data structure to be created, a timestamp, an adopted consensus algorithm, and the like, but the present disclosure is not limited to the above information.

In an example, the nodes in the node list may include not only the requesting node itself, but also other nodes belonging to the same organization as the requesting node, so that the requesting node can cause one or more other nodes of the same organization join the created second network together and participate in user transactions.

The verifying module 702 verifies the second network creation request message.

The verifying module 702 may verify the digital signature included in the second network creation request message in the process described in step S202, so that the second network creation request message is further processed in response to successful verification.

In an example, the access control module 705 in the management node 700 may locally maintain a first network member list based on the data block in the first chain data structure. If the above verification on the digital signature is successful, the verifying module 702 may further verify an identity of the requesting node that sent the second network creation request message using the first network member list. Correspondingly, the management node 700 may generate a second network creation transaction if it is determined that the requesting node is a member of the first network, and may discard the second network creation request message if it is determined that the requesting node is not a member of the first network. By verifying the identity of the requesting node in the above process, only members of the first network who access the first network and have a right to participate in management transactions are allowed to send a valid second network creation request message, thereby preventing nodes outside the consortium arbitrarily tampering the membership in the network and affecting the user data.

In the following, when receiving other request messages other than the management request message for creating a consortium (for example, the first network creation request message) or the management request message for joining the consortium (for example, the first network change request message), the management node 700 may also verify an identity of a requesting node using the first network member list, and the detailed description thereof will be omitted here.

The processing module 703 generates a second network creation transaction based on the second network creation request message, and broadcasts the second network creation transaction in the first network, in response to successful verification.

If the above verification is successful, the processing module 703 may allocate a chain unique identifier for a second chain data structure to be created, so as to generate the second network creation transaction and broadcast the second network creation transaction in the first network that is accessed by the requesting node. Here, the second network creation transaction may include the allocated chain unique identifier and various information (for example, a node list, etc.) included in the second network creation request message.

The processing module 703 collects one or more feedback messages on the second network creation transaction from one or more member nodes in the first network are collected, and determines whether to create a second network based on the feedback messages.

Here, the member nodes in the first network may decide to approve or reject the second network creation transaction, and send a feedback message for the second network creation transaction in a similar manner as described above. For example, the member nodes may send the second network creation transaction including a digital signature as the feedback message indicating approval.

In an example, the processing module 703 may collect the feedback messages sent by member nodes in the first network within a predetermined period, and may use the feedback messages as the input of the second smart contract. Here, a data block including the second network creation transaction is generated in the first chain data structure using the second smart contract, in response to determining to create the second network.

Specifically, in the second smart contract, it may be defined that if a predetermined number of valid feedback messages indicating approval are received within a predetermined period, it is determined to create a second network, add an operation result of the second smart contract to the second network creation transaction, and generate the data block including the second network creation transaction in the first chain data structure. Here, a digital signature may be included in the feedback message so as to be verified, and it may be determined that the feedback message is a valid feedback message if the verification is successful.

In a case where it is determined to create the second network, the generated data block including the second network creation transaction may be synchronized at the member nodes in the first network. After receiving the data block including the second network creation transaction, the requesting node serving as a member of the first network may generate a genesis data block of the created second chain data structure, and synchronize the genesis data block to other nodes in the node list, so as to complete the operations of creating the second network and creating the second chain data structure. Here, the genesis data block may record a consortium unique identifier, a chain unique identifier, and various information (for example, a consensus algorithm, a node list, etc.) included in the second network creation request message. In this process, the genesis data block of the second chain data structure is generated by the requesting node but not the management node 700, thus it is possible to prevent malicious tampering with the node list after the management node 700 is hacked, thereby further ensuring the privacy and security of the user data.

In addition, after obtaining the genesis data block of the second chain data structure, the nodes in the node list may also start to locally maintain a second network member list based on the member list included in the genesis data block. Here, the second network member list may be used to implement access control on the second network, thereby further improving the security of the user data of the consortium. Specifically, after receiving a user transaction that is broadcast in the second network, a member node in the second network may determine whether the node that sent the corresponding request message is included in the second network member list, based on the locally maintained second network member list. Then, if it is determined that the node that sent the request message is included in the second network member list, the user transaction is processed, and if it is determined that the node that sent the request message is not included in the second network member list, the user transaction is discarded. In a case where the nodes access two and more second networks and participate in the maintenance of different second chain data structures, the nodes may locally store information such as names and chain unique identifiers of the second chain data structures corresponding to the respective second network member lists, so as to distinguish the different second network member lists.

The management node 700 may also implement the processing for joining or leaving the second network established in the consortium according to the embodiment of the present disclosure as shown in FIG. 6.

In this process, the receiving module 701 receives a second network change request message sent by a requesting node.

Specifically, the requesting node may send the second network change request message as the management request message to the management node, so that the requesting node joins or leaves the second network. Here, the requesting node as a member of the first network may access the management data in the first chain data structure and obtain information about the second networks established in the consortium, so as to select one or more second networks to join. The second network change request message according to the embodiment of the present disclosure may include the name of the second chain data structure, a timestamp, a node list, and the like, and the present disclosure is not limited to such information. Similarly, the nodes in the node list may include not only the requesting node itself, but also other nodes that belong to the same organization as the requesting node, so that the requesting node can cause one or more other nodes of the same organization to join or leave the second network.

The verifying module 702 verifies the second network change request message.

Here, the verifying module 702 may verify a digital signature included in the received second network change request message and an identity of the requesting node in a process similar to the above. Then, the verifying module 702 may generate the second network change transaction in response to successful verification. For example, the verifying module 702 may verify the identity of the requesting node based on the first network member list, so that only members of the first network who access the first network and have a right to participate in management transactions are allowed to send a valid second network change request message.

The processing module 703 generates a second network change transaction based on the second network change request message, and broadcasts the second network change transaction in first network, in response to successful verification.

Preferably, the processing module 703 may obtain the updated second network member list by adding the nodes in the node list to the current second network member list or deleting the nodes from the current second network member list, and may add the updated second network member list to the second network change transaction. Note that the second network change transaction according to the embodiment of the present disclosure may also include various information included in the second network change request message, such as the name of the second chain data structure, a timestamp, and the like.

The processing module 703 collects one or more feedback messages on the second network change transaction from one or more member nodes in the first network, and determines whether to change a member node in the second network based on the feedback messages.

Here, the member nodes in the first network may decide to approve or reject the second network change transaction, and send the feedback messages for the second network change transaction in a similar manner as described above. For example, the member node may send the second network change transaction including a digital signature as the feedback message indicating approval.

In an example, the processing module 703 may collect the feedback messages sent by member nodes in the first network within a predetermined period, and may use the feedback messages as the input of the second smart contract. Here, a data block including the second network change transaction is generated in the first chain data structure using the second smart contract, in response to determining to change a member node in the second network.

Specifically, in the second smart contract, it may be defined that if a predetermined number of valid feedback messages indicating approval are received within a predetermined period, it is determined to change the member node in the second network, add an operation result of the second smart contract to the second network change transaction, and generate the data block including the second network change transaction in the first chain data structure. Here, a digital signature may be included in the feedback message so as to be verified, and it may be determined that the feedback message is a valid feedback message if the verification is successful.

In a case where it is determined to change the second network, the generated data block including the second network change transaction may be synchronized at the member nodes in the first network, so as to complete the change of the member in the second network. Preferably, after obtaining the data block including the second network change transaction, a member node that accesses both the first network and one or more second networks may update the second network member list that is locally maintained, based on the data block, and may send the updated second network member list to other member nodes of the same organization that only access the second network, so as to update the second network member list maintained by the member nodes of the same organization that only access the second network.

The management node for the management consensus of the consortium chain data structure network according to the embodiment of the present disclosure can isolate the management data from the user data. The management node only has the authority to access the management data. Thus, it is possible to improve the efficiency of reaching the management consensus using the management node, thereby further guaranteeing the privacy and security of the user data. In addition, the management node can also support dynamically changing membership in the consortium based on the consensus of all parties in the network. Furthermore, only in a case where all existing organizations in the consortium have reached a consensus to allow a new organization node to join the consortium, the new organization node can be allowed to join the consortium, thereby further improving the security of the user data. Additionally, various types of the management data including the updated member list is recorded in the first chain data structure, thus it is possible to prevent the management data of the consortium from being tampered by using the immutability characteristics of the chain data structure itself, thereby preventing malicious nodes accessing the user data and improving the security of the user data of the consortium members.

Figure 8:
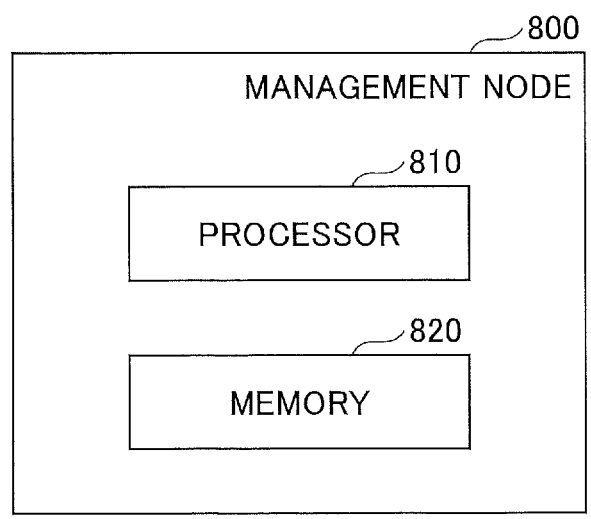
FIG. 8 is a schematic block diagram illustrating a management node according to another embodiment of the present disclosure.

In another embodiment of the present disclosure, a management node for management consensus of a consortium chain data structure network is further provided. FIG. 8 is a schematic block diagram illustrating a management node according to another embodiment of the present disclosure. As shown in FIG. 8, the management node 800 may be a computer or a server. Here, the consortium chain data structure network include a first network that maintains a first chain data structure for recording management data, and a second network that maintains a second chain data structure for recording user data. The management node 800 only accesses the first network.

As shown in FIG. 8, the management node 800 includes one or more processors 810, and a memory 820. It should be noted that, the management node 800 may further include an input device, an output device and the like (not shown). These components may be interconnected by a bus system and/or another form of connection mechanism. It should be noted that, the components and structures of the management node 800 shown in FIG. 8 are merely exemplary and not limiting, and the management node 800 may have other components and structures as desired.

The processor 810 may be a central processing unit (CPU) or another form of processing unit having data processing capabilities and/or instruction execution capabilities, and may utilize computer program instructions stored in the memory 820 to perform desired functions. The processor 810 may be configured to receive a management request message sent by a requesting node; verify the management request message; and process the management request message in response to successful verification on the management request message. Here, a data block in the first chain data structure is generated based on a result of the processing.

The memory 820 may include one or more computer program products, and the computer program products may include various forms of computer readable storage media, such as volatile memory and/or nonvolatile memory. One or more computer program instructions may be stored in the computer readable storage medium, and the processor 810 may execute the program instructions to implement the functions of the apparatus of the embodiments of the invention described above and/or other desired functions, and/or may perform the method of the embodiments of the present invention. Various application programs and various data may also be stored in the computer readable storage medium.

In another embodiment of the present disclosure, a non-transitory computer-readable recording medium is further provided. The non-transitory computer-readable recording medium has computer-executable instructions for execution by one or more processors. When the computer-executable instructions are executed, the computer-executable instructions cause the one or more processors to carry out a method for managing a consortium chain data structure network. The consortium chain data structure network includes a first network that maintains a first chain data structure for recording management data, and a second network that maintains a second chain data structure for recording user data. A management node for management consensus of the consortium chain data structure network only accesses the first network. The method includes receiving, by the management node, a management request message sent by a requesting node; verifying, by the management node, the management request message; and processing, by the management node, the management request message in response to successful verification on the management request message. Here, a data block in the first chain data structure is generated based on a result of the processing.

By using the method for managing the consortium chain data structure network, the management node, and the non-transitory computer-readable recording medium, it is possible to improve the efficiency of reaching management consensus, further guarantee the privacy and security of user data, and effectively manage membership in the consortium chain data structure network.

It should be noted that, the above specific embodiments are just examples and the present invention is not limited to these embodiments. A person skilled in the art may merge and combine the steps and apparatuses separately described in the embodiments according to the concept of the present invention to achieve the effect of the present invention. The above embodiments obtained by the merging and combination are included in the present invention and their descriptions are omitted here.

It should be noted that, the advantages, benefits and effects described in the present specification are just examples, the present invention is not limited to these examples, and it cannot be considered that these advantages, benefits and effects are required by the embodiments of the present invention. Furthermore, the specific content of the present specification is only for description and understanding rather than limitation, and the present invention is not limited to specific content.

The block diagrams of the units, apparatuses, devices and system are just examples, the connection, placement and configuration illustrated in the block diagrams related to the present invention are not limited to these examples, and the units, apparatuses, devices and system may be connected, placed or configured, in any way. The terms "comprise", "include" and "have" are open-form terms, which mean and may be changed into "include and is not limited to". The terms "or" and "and" mean and may be changed into "and/or", unless the context is clearly not applicable. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a", "an" and "the" should not be limited to the singular element.

The steps or apparatuses of the present invention are described above. The above descriptions of the embodiments are just examples, and various modifications, replacements or combinations may be made without departing from the scope of the present invention by persons skilled in the art.

The steps of the above method may be performed by any appropriate means that can perform the corresponding functions. The means may include any components and/or modules of hardware and/or software, and include but are not limited to a circuit, a dedicated application-specific integrated circuit (ASIC) or a processor.

The present invention may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processor, controller, micro-controller or state machine that can be obtained commercially. The processor may also be the combination of computer equipment, such as the combination of a DSP and a micro-processor, the combination of plural micro-processors, or the combination of a DSP and plural micro-processors.

The steps of the method according to the present invention may be incorporated in the hardware, software modules executed by a processor or the combination of these two directly. The software modules may be stored in a recording medium with any configuration. The examples of the recording medium includes a random access memory (RAM), a read-only memory (ROM), a flash memory, an EPROM memory, an EEPROM memory, a register, a hard disk drive, a removable disk, a CD-ROM, etc. The recording medium may be linked to a processor so that the processor reads information from the recording medium or writes information into the recording medium. Alternatively, the recording medium and the processor may also be a whole apparatus. The software module may be a single command or many commands, and may be distributed in several code segments, different programs or plural recording media.

Steps of the above method may be performed in a time order as above, however the performing sequence is not limited to such a time order. Any steps may be performed in parallel or independently.

The functions may be realized by hardware, software, firmware or any combination thereof. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such a disk and disc include a CD, a laser disc, an optical disc, a DVD disc, a floppy disk and a blue-ray disc, and the disk usually reproduces data by magnetization and the disc reproduces data by a laser.

Thus, the operations may be performed by a computer program product. For example, such a computer program product may be a tangible medium where computer-readable commands are stored (or coded), and the commands may be executed by one or more processors to perform the operation. The computer program product may include packaging material.

The software or commands may also be transmitted by a transmission medium. For example, a coaxial cable, an optical cable, a twisted cable, a digital subscriber line (DSL), or a transmission medium of the wireless technology of infrared, wireless or microwave may be used to transmit the software from a website, a server or another remote source.

Additionally, the modules and/or other appropriate means of the method or technology may be obtained from a user terminal and/or base station, or by other methods. For example, such equipment may be connected to a server so as to perform the transmission of the means of the above method. Alternatively, the methods may be provided via a storage unit (for example, a physical storage medium such as a RAM, a ROM, a CD or a floppy disk), so that the user terminal and/or the base station can obtain the methods when it is connected to the equipment. Furthermore, any other appropriate technology may be provided to the equipment by the method.

The present specification and the appended claims include other examples and implementations. For example, the above functions may be implemented by a processor, hardware, software, firmware, hard-wire or any combination thereof. The features for implementing the functions may be located at any physical location, including being distributed such that a part of the functions may be realized at a different physical location(s). Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

Various modifications, replacements or combinations may be made without departing from the scope of the present invention by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present invention. Therefore, the scope of the appended claims include such processing, machine, manufacture, composition of events, means, method and operation.

The embodiments have been described above so that persons skilled in the art can implement the present invention. Various modifications to these embodiments will be apparent to persons skilled in the art, and the general principles defined herein may be applied to other aspects without departing from the scope of the present invention. Thus, the present invention is not intended to be limited to the above described embodiments, but rather is the broadest scope consistent with the principles and novel features of the present invention.

The foregoing has been described for purposes of illustration and understanding. The above description is not intended to limit the embodiments of the present invention. While several embodiments and examples have been described above, variations, modifications, changes, additions, and combinations can be performed by persons skilled in the art.

What is claimed is:

1. A method for managing a consortium chain data structure network, the consortium chain data structure network including a first network that maintains a first chain data structure for recording management data of the consortium chain data structure network, and a second network that maintains a second chain data structure for recording user data, the method comprising:
   receiving, by the management node, a management request message sent by a requesting node;
   verifying, by the management node, the management request message; and
   processing, by the management node, the management request message in response to successful verification on the management request message,
   wherein a data block in the first chain data structure is generated based on a result of the processing, and
   wherein a management node for management consensus of the consortium chain data structure network only accesses the management data of the consortium chain data structure network without accessing the user data.

2. The method for managing a consortium chain data structure network as claimed in claim 1,
   wherein the management node issues a node digital certificate to the requesting node in advance, and
   wherein verifying the management request message includes
      verifying, using the node digital certificate, a digital signature included in the management request message.

3. The method for managing a consortium chain data structure network as claimed in claim 2,
   wherein the management request message is a first network creation request message, and the first network creation request message includes a node list, and
   wherein processing the management request message includes
      generating a genesis data block of the first chain data structure based on the first network creation request message; and
      synchronizing the genesis data block of the first chain data structure to one or more nodes included in the node list.

4. The method for managing a consortium chain data structure network as claimed in claim 3,
   wherein the genesis data block includes an updated node list, and the updated node list is obtained by adding the management node to the node list included in the first network creation request message.

5. The method for managing a consortium chain data structure network as claimed in claim 2,
   wherein the management request message is a first network change request message, and
   wherein processing the management request message includes
      generating a first network change transaction based on the first network change request message, and broadcasting the first network change transaction in the first network; and
      collecting one or more feedback messages on the first network change transaction from one or more member nodes in the first network, and determining, based on the feedback messages, whether to change a member node in the first network.

6. The method for managing a consortium chain data structure network as claimed in claim 5,
   wherein determining whether to change the member node in the first network includes
      using the received feedback messages as input of a first smart contract, and
   wherein a data block including the first network change transaction is generated in the first chain data structure using the first smart contract, in response to determining to change the member node in the first network.

7. The method for managing a consortium chain data structure network as claimed in claim 2,
   wherein the management request message is a second network creation request message or a second network change request message,
   wherein if the management request messaue is the second network creation request message, processing the management request message includes
      generating a second network creation transaction based on the second network creation request message, and broadcasting the second network creation transaction in the first network; and
      collecting one or more feedback messages on the second network creation transaction from one or more member nodes in the first network, and determining, based on the feedback messages, whether to create a second network, and
   wherein if the management request message is the second network change request message, processing the management request message includes
      generating a second network change transaction based on the second network change request message, and broadcasting the second network change transaction in the first network; and
      collecting one or more feedback messages on the second network change transaction from one or more member nodes in the first network, and determining, based on the feedback messages, whether to change a member node in the second network.

8. The method for managing a consortium chain data structure network as claimed in claim 7,
   wherein the management node locally maintains a first network member list based on the data block in the first chain data structure, and
   wherein verifying the management request message further includes
      verifying, using the first network member list, an identity of the requesting node that sent the second network change request message.

9. The method for managing a consortium chain data structure network as claimed in claim 8, the method further comprising:
using the received feedback messages as input of a second smart contract,
wherein if the management request message is the second network creation request message, a data block including the second network creation transaction is generated in the first chain data structure using the second smart contract, in response to determining to create the second network, and
wherein if the management request message is the second network change request message, a data block including the second network change transaction is generated in the first chain data structure using the second smart contract, in response to determining to change the member node in the second network.

10. The method for managing a consortium chain data structure network as claimed in claim 9,
wherein if the management request message is the second network creation request message, the requesting node generates a genesis data block of a created second chain data structure, using the data block including the second network creation transaction that is generated in the first chain data structure.

11. The method for managing a consortium chain data structure network as claimed in claim 1,
wherein a member node that accesses both the first network and the second network updates a first network member list and a second network member list that are locally maintained, and updates a second network member list maintained by a member node of the same organization that only accesses the second network, using the data block in the first chain data structure.

12. A management node for management consensus of a consortium chain data structure network, the consortium chain data structure network including a first network that maintains a first chain data structure for recording management data of the consortium chain data structure network, and a second network that maintains a second chain data structure for recording user data, the management node comprising:
a memory storing computer-executable instructions; and
one or more processors configured to execute the computer-executable instructions such that the one or more processors are configured to
receive a management request message sent by a requesting node;
verify the management request message; and
process the management request message in response to successful verification on the management request message,
wherein a data block in the first chain data structure is generated based on a result of the processing, and
wherein the management node only accesses the management data of the consortium chain data structure network without accessing the user data.

13. The management node as claimed in claim 12,
wherein the management node issues a node digital certificate to the requesting node in advance, and
wherein the one or more processors are configured to verify, using the node digital certificate, a digital signature included in the management request message.

14. The management node as claimed in claim 13,
wherein the management request message is a first network creation request message, and the first network creation request message includes a node list, and
wherein the one or more processors are configured to
generate a genesis data block of the first chain data structure based on the first network creation request message; and
synchronize the genesis data block of the first chain data structure to one or more nodes included in the node list.

15. The management node as claimed in claim 14,
wherein the genesis data block includes an updated node list, and the updated node list is obtained by adding the management node to the node list included in the first network creation request message.

16. The management node as claimed in claim 13,
wherein the management request message is a first network change request message, and
wherein the one or more processors are configured to
generate a first network change transaction based on the first network change request message, and broadcast the first network change transaction in the first network; and
collect one or more feedback messages on the first network change transaction from one or more member nodes in the first network, and determine, based on the feedback messages, whether to change a member node in the first network.

17. The management node as claimed in claim 16,
wherein the one or more processors are configured to use the received feedback messages as input of a first smart contract, and
wherein a data block including the first network change transaction is generated in the first chain data structure using the first smart contract, in response to determining to change the member node in the first network.

18. The management node as claimed in claim 13,
wherein the management request message is a second network creation request message or a second network change request message,
wherein if the management request message is the second network creation request message, the one or more processors are configured to
generate a second network creation transaction based on the second network creation request messaue, and broadcast the second network creation transaction in the first network; and
collect one or more feedback messages on the second network creation transaction from one or more member nodes in the first network, and determine, based on the feedback messages, whether to create a second network, and
wherein if the management request message is the second network change request message, the one or more processors are configured to
generate a second network change transaction based on the second network change request message, and broadcast the second network change transaction in the first network; and
collect one or more feedback messages on the second network change transaction from one or more member nodes in the first network, and determine, based on the feedback messages, whether to change a member node in the second network.

19. The management node as claimed in claim 18,
wherein the management node locally maintains a first network member list based on the data block in the first chain data structure, and
wherein the one or more processors are further configured to verify, using the first network member list, an identity of the requesting node that sent the second network change request message.

20. A non-transitory computer-readable recording medium having computer-executable instructions for execution by one or more processors, wherein, the computer-executable instructions, when executed, cause the one or more processors to carry out a method for managing a consortium chain data structure network, the consortium chain data structure network including a first network that maintains a first chain data structure for recording management data of the consortium chain data structure network, and a second network that maintains a second chain data structure for recording user data, the method comprising:
  receiving, by the management node, a management request message sent by a requesting node;
  verifying, by the management node, the management request message; and
  processing, by the management node, the management request message in response to successful verification on the management request message,
  wherein a data block in the first chain data structure is generated based on a result of the processing, and
  wherein a management node for management consensus of the consortium chain data structure network only accesses the management data of the consortium chain data structure network without accessing the user data.

* * * * *